United States Patent [19]
Barri et al.

[11] Patent Number: 5,271,002
[45] Date of Patent: Dec. 14, 1993

[54] COMMUNICATION SWITCHING ELEMENT

[75] Inventors: Peter I. A. Barri, Bonheiden; Jan L. B. De Groote, Schilde, both of Belgium

[73] Assignee: Alcatel N.V., Amsterdam, Netherlands

[21] Appl. No.: 561,933

[22] Filed: Aug. 2, 1990

[51] Int. Cl.[5] .................... H04Q 11/04; H04L 12/54
[52] U.S. Cl. .................................. 370/58.1; 370/61
[58] Field of Search ............... 370/53, 54, 58.1, 58.2, 370/58.3, 60, 60.1, 94.1, 61

[56] References Cited

U.S. PATENT DOCUMENTS

| | | | |
|---|---|---|---|
| 4,731,785 | 3/1988 | Ferenc et al. | 370/60 |
| 4,813,037 | 3/1989 | Debuysscher et al. | 370/94.1 |
| 4,912,702 | 3/1990 | Verbiest | 370/94.1 |
| 5,020,052 | 5/1991 | DePrycker et al. | 370/60 |
| 5,022,025 | 6/1991 | Urushidani et al. | 370/60 |

FOREIGN PATENT DOCUMENTS 8807298  9/1988  World Int. Prop. O.

OTHER PUBLICATIONS

"A Flexible Customer Premises Network Concept Based on ATM Principles" The International Symposium on Subscriber Loops and Services, Boston Sep. 11–16, 1988, pp. 12.3.1–12.3.5, B. Pauwels.

*Primary Examiner*—Douglas W. Olms
*Assistant Examiner*—Alpus H. Hsu
*Attorney, Agent, or Firm*—Robbins, Berliner & Carson

[57] ABSTRACT

Communication switching element (SE) with a plurality of input receiver circuits (RC01/16), a plurality of output transmitter circuits (TC01/17), and a plurality of control circuits (CMC01/08) each with a data write bus (DB01/08), with a plurality of data buffers (DB0101/1601); DB0108/1608) coupling the input circuits to the data bus, and with a plurality of RAMs (RAM0101/1701; RAM0108/1708) each with an input individually connected to the data write bus and with an output individually connected to a respective one of the output circuits.

17 Claims, 6 Drawing Sheets

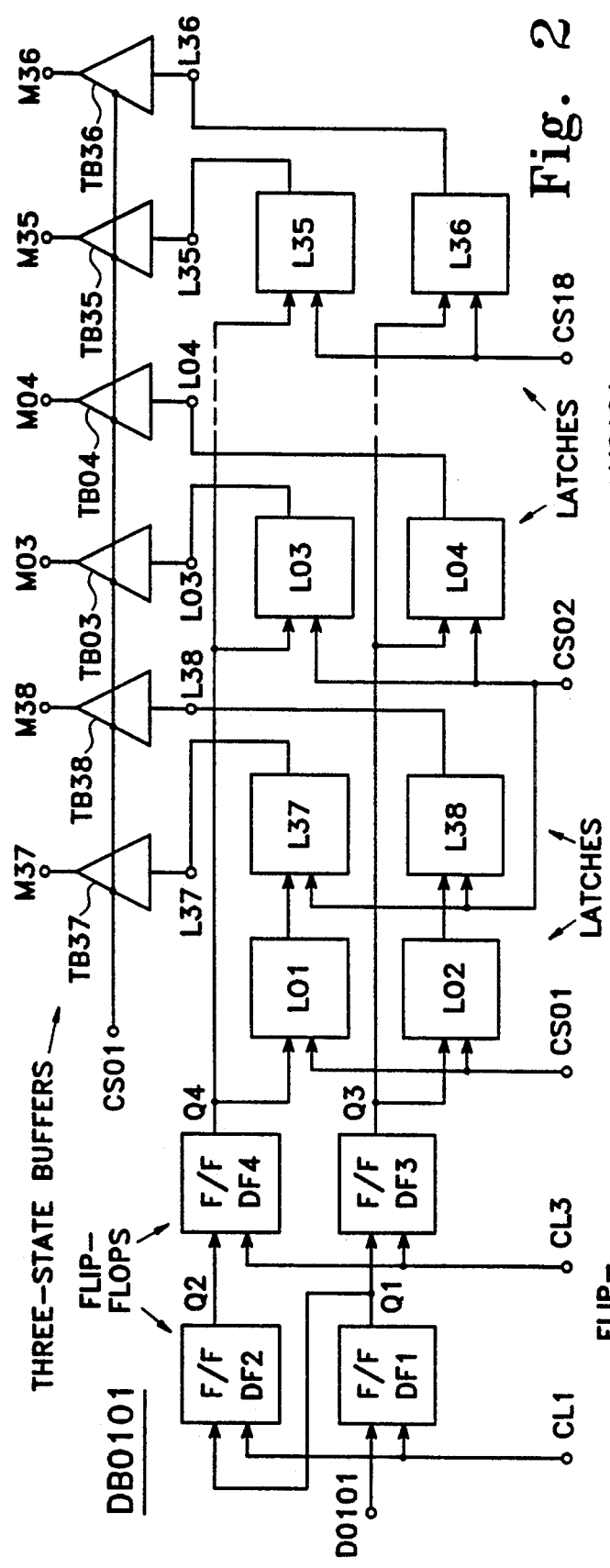
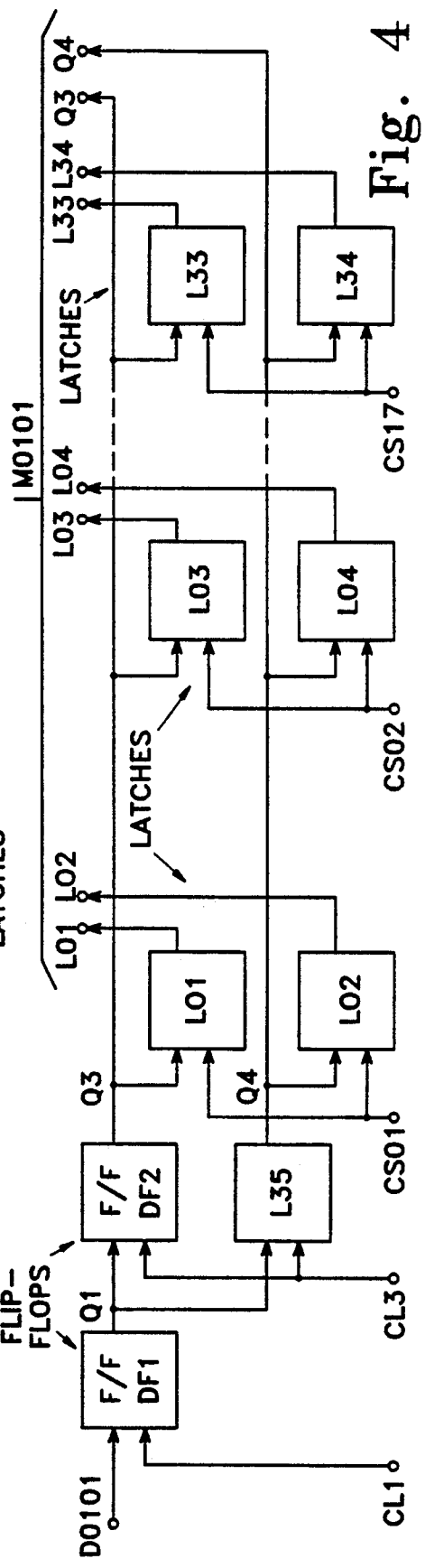
Fig. 2
Fig. 4

COMMUNICATION SWITCHING ELEMENT

TECHNICAL FIELD

The present invention relates to a communication switching element with a plurality of input circuits, a plurality of output circuits, at least one set of memory circuits allocated to respective ones of said output circuits and at least one control circuit with a data write bus to which data outputs of said input circuits as well as data inputs of said set of memory circuits are coupled, said set of memory circuits having data outputs coupled to said output circuits.

BACKGROUND ART

Such a communication switching element is already described in the international patent application No. PCT/EP88/00212 (P. Debuysscher 5). This known switch element includes a plurality of sets of memory circuits, the data inputs and outputs of each set of memory circuits being connected to a common output on the data write bus and to the output or transmitter circuits through a data read bus respectively. The input or receiver circuits are moreover coupled to a read and write control circuit which is provided in common for all the memory circuits and which is coupled to these memory circuits through an address bus. As a consequence only one memory circuit of a set may be selected at a time to enter data from a receiver circuit or to output data to the allocated output or transmitter circuit. This means that the same data cannot be written in two or more transmitter circuits, as may be for instance required when a point-to-multipoint connection has to be established. Also because the reading operation of the various memory circuits has to be performed in succession for these circuits this operation is relatively time consuming.

DISCLOSURE OF INVENTION

An object of the present invention is to provide a communication switching element of the above type, but which does not present these drawbacks.

According to the invention this object is achieved due to the fact that said data inputs and outputs of said set of memory circuits are individually coupled to said data write bus and to said respective output circuits.

Data may thus be simultaneously written in two or more memory circuits by a same writing operation and data may be transferred to the associated output circuits by a same reading operation.

In a paper presented at the International Symposium on Subscriber Loops and Services, Boston, Sep. 11-16, 1988, and entitled "A flexible customer premises network concept based on ATM principles", B. Pauwels has envisaged an Asynchronous Transfer Mode two-coordinate switching element wherein the data inputs of each of a plurality of N sets of M memory circuits are coupled to a respective one of a plurality of N data write busses. However, the N input or receiver circuits are only coupled to respective ones of these busses. Moreover, the M sets of N memory circuits allocated to a respective one out of a plurality of M output circuits are coupled thereto through M data read busses so that the reading of the memory circuits in each of the M sets of N has to be performed in succession.

Another characteristic feature of the present communication switching element is that the memory circuits of said set have a common write signal input as well as a common read signal input.

Still another characteristic feature of the present communication switching element is that said input circuits are each coupled to said data bus via a data buffer means and are able to store groups of data in said data buffer means in a staggered fashion, each group being stored during a first time interval, said data buffer means being able to put their respective groups of data successively on said data bus during a second time interval which differs from the first time interval by a third time interval and that the switching element further includes a clock circuit providing write and read signals making said write and read signal inputs of said memory circuits operative during said second and third time intervals respectively.

Yet another characteristic feature of the present communication switching element is that said memory circuits are Random Access Memories of the single port type.

Random Access Memories (RAMs) are preferred over FIFO's because the latter introduce relatively large delays. On the other hand, RAMs of the single port type have the advantage, when integrated on a chip, of occupying less surface than RAMs of the dual port type and are therefore also less expensive.

The above mentioned and other objects and features of the invention will become more apparent and the invention itself will be best understood by referring to the following description of an embodiment taken in conjunction with the accompanying drawings wherein:

BRIEF DESCRIPTION OF DRAWING

FIG. 2 shows a first embodiment of the data buffer DB0101 of FIG. 1;

FIG. 4 shows a second embodiment of the data buffer DB0101 of FIG. 1;

BEST MODE FOR CARRYING OUT THE INVENTION

Figure 1:
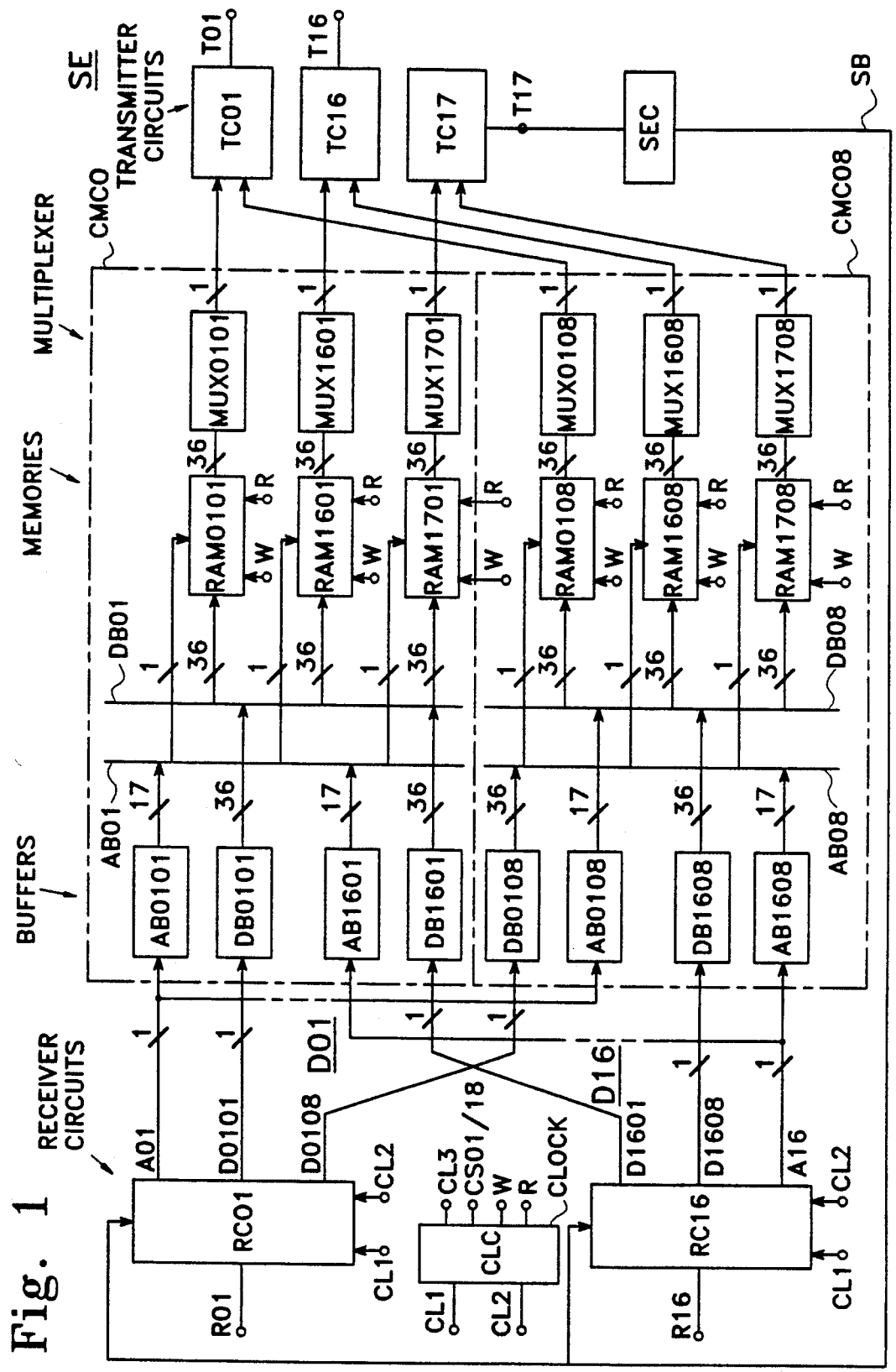
FIG. 1 represents a communication switching element SE according to the invention.

The communication switching element SE shown in FIG. 1 forms part of a communication switching network wherein a plurality of such elements are interconnected in a modular way. The switching element SE is able to switch fixed length packets or cells of digital signals transmitted according to Asynchronous Transfer Mode (ATM) techniques, also called Asynchronous Time Division (ATD) techniques, from a plurality of 16 signal inputs R01 to R16 to a plurality of signal outputs T01 to T17. Each cell comprises for instance 36 bytes of which 4 bytes are used as a header and of which the 32 remaining bytes are data.

The switching element SE includes 16 receiver circuits RC01/16, 17 transmitter circuits TC01/17, 8 control or central memory circuits CMC01/08, a switch element control circuit SEC and a clock circuit CLC.

These circuits of which only CLC, SEC, RC01, RC16, TC01, TC16, TC17, CMC01 and CMC08 are shown are interconnected as indicated and as will become clear from the following.

The receiver circuits RC01/16 are substantially, but not completely, of the type described in the international patent application No. PCT/EP88/00273 (corresponding to commonly assigned U.S. application Ser. No. 07/585,167 in the name of B. J. G. Pauwels) relating to the above mentioned two-coordinate switching element and each have a respective single wire data input R01/16, a respective single wire address output A01/16 and a respective 8-wire data output D01/16 of which the constituent wires are indicated by D0101 to D0108/D1601 to D1608 respectively. Each receiver circuit further has an additional data input connected to a selection bus SB and two clock inputs CL1 and CL2 which are common for all the receiver circuits. Supposing that data at 600 Megabits/sec are supplied to RC01/16 the clock signal CL1 has a byte frequency of 600/8 or 75 MHz, whilst the clock signal CL2 has a cell frequency equal to 600/288 MHz since each cell contains 36 bytes or 288 bits.

Each of the central memory circuits CMC01 to CMC08 includes 16 address buffers AB0101/1601 to AB0108/1608 assigned to the receiver circuits RC01 to RC16 respectively, 16 data buffers DB0101/1601 to DB0108/1608 also allocated to these receiver circuits, 17 single port Random Access Memories (or RAMs) RAM 0101/1701 to RAM0108/1708 allocated to the transmitter circuits TC01 to TC17 respectively, 17 multiplexers MUX0101/1701 to MUX 0108/1708 associated to these RAMs, a 17-wire address bus AB01 to AB08 and a 36-wire data bus DB01 to DB08.

The 16 address outputs A01 to A16 of the respective receiver circuits RC01 to RC16 are connected to the parallel connected inputs of sets of 8 address buffers AB0101/0108 to AB1601/1608 respectively and the data outputs D0101/0108 to D1601/1608 of these receiver circuits are individually connected to the inputs of the data buffers DB0101/0108 to DB1601/1608 respectively.

Each of the address buffers has a 17-wire address output and the outputs of the address buffers of a same central memory circuit are connected to the 17-wire address bus allocated to this memory circuit. Likewise, each of the data buffers has a 36-wire data output and the outputs of the data buffers of a same central memory circuit are connected to the 36-wire data bus allocated to this memory circuit. For instance, the outputs of the address and data buffers of CMC01 and CMC08 are connected to the address busses AB01 and AB08 and to the data busses DB01 and DB08 respectively.

Each of the 17 RAMs RAM0101/1701 to RAM0108/1708 of the central memory circuit CMC01 to CMC08 has a single wire address input which is individually connected to a respective one of the 17 wires of the associated address bus, and has moreover a 36-wire data input which is connected to the associated data bus. For instance, the address inputs of the RAMs RAM0101 to RAM1701 included in CMC01 are connected to respective wires of the 17-wire address bus AB01 and the data inputs of these RAMs are all connected in parallel to the 36-wire data bus DB01. Each of the RAMs also has a 36-wire output which is connected to the 36-wire input of the associated multiplexer having a single wire output. All the RAMs of the switching element SE moreover have a common write signal input W and a common read signal input R. The outputs of the sets of 8 multiplexers DMUX0101/0108 to DMUX 1701/1708 are connected to the 8 inputs of the transmitter circuits TC01 to TC17 respectively.

These transmitter circuits TC01 to TC17 have signal outputs T01 to T17 respectively. T01 to T16 are connected to a further switching element (not shown), whilst T17 is connected to the switch element control circuit SEC and from there to a data input of each of the receiver circuits RC01 to RC16 through the selection bus SB, in the way described in the international PCT patent application No. PCT/EP88/00482 (corresponding to commonly assigned U.S. application Ser. No. 07/613,511 in the name of P. I. A. Barri).

Figure 3:
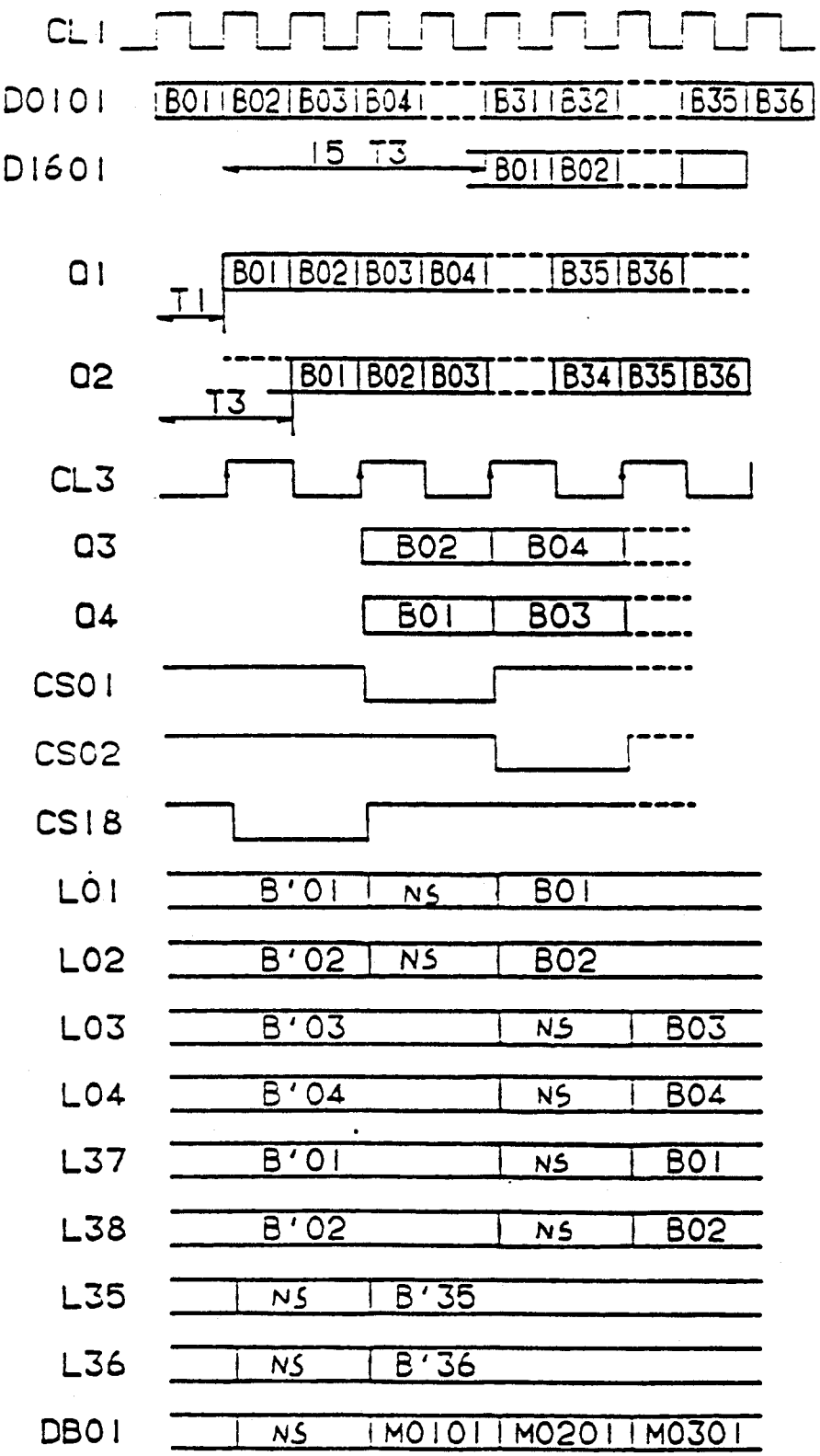
FIG. 3 represents pulse waveforms illustrating the operation of the data buffer DB0101 of FIG. 2.
Figure 5:
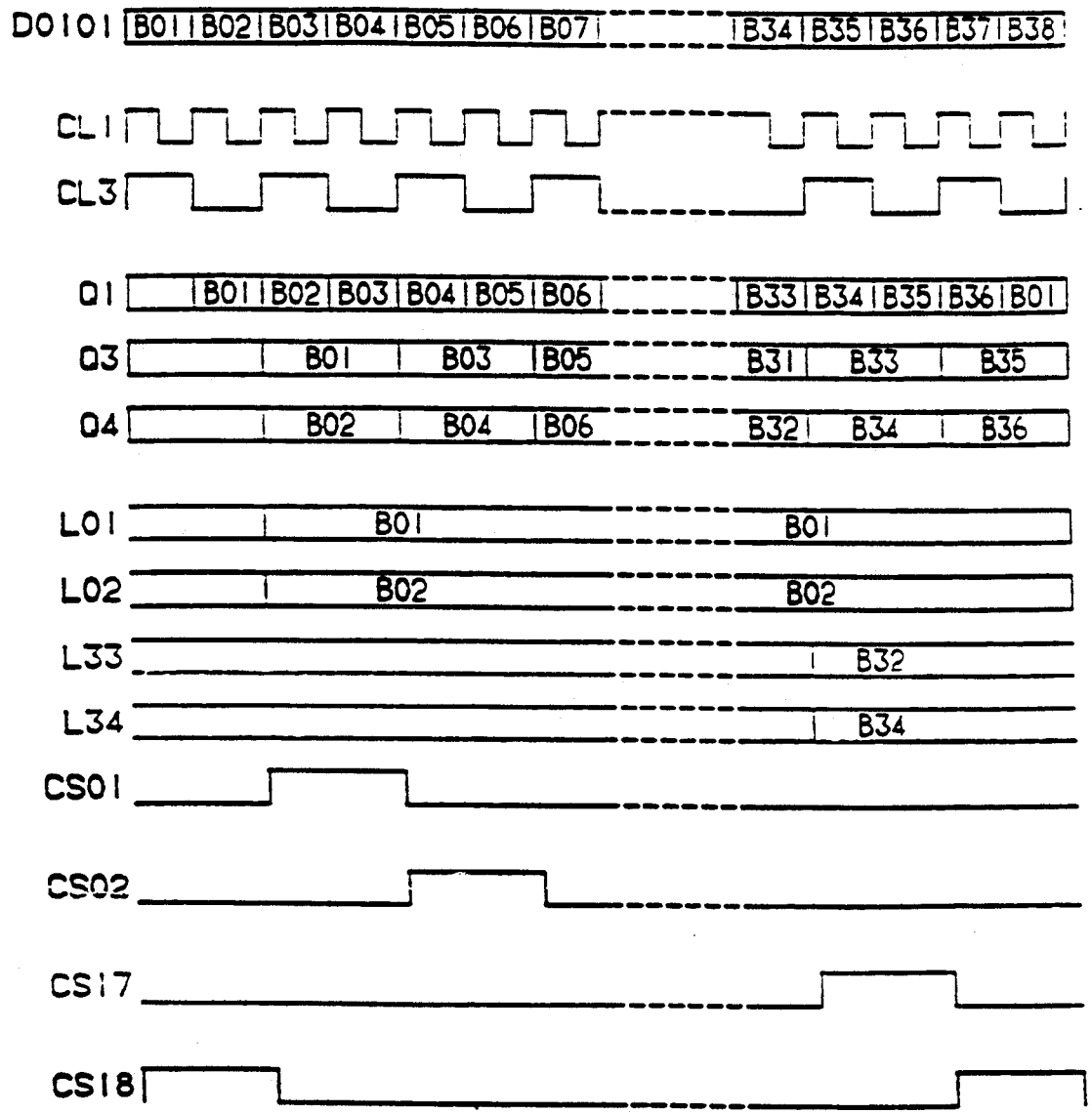
FIG. 5 represents pulse waveforms illustrating the operation of the data buffer of FIG. 4.
Figure 7:
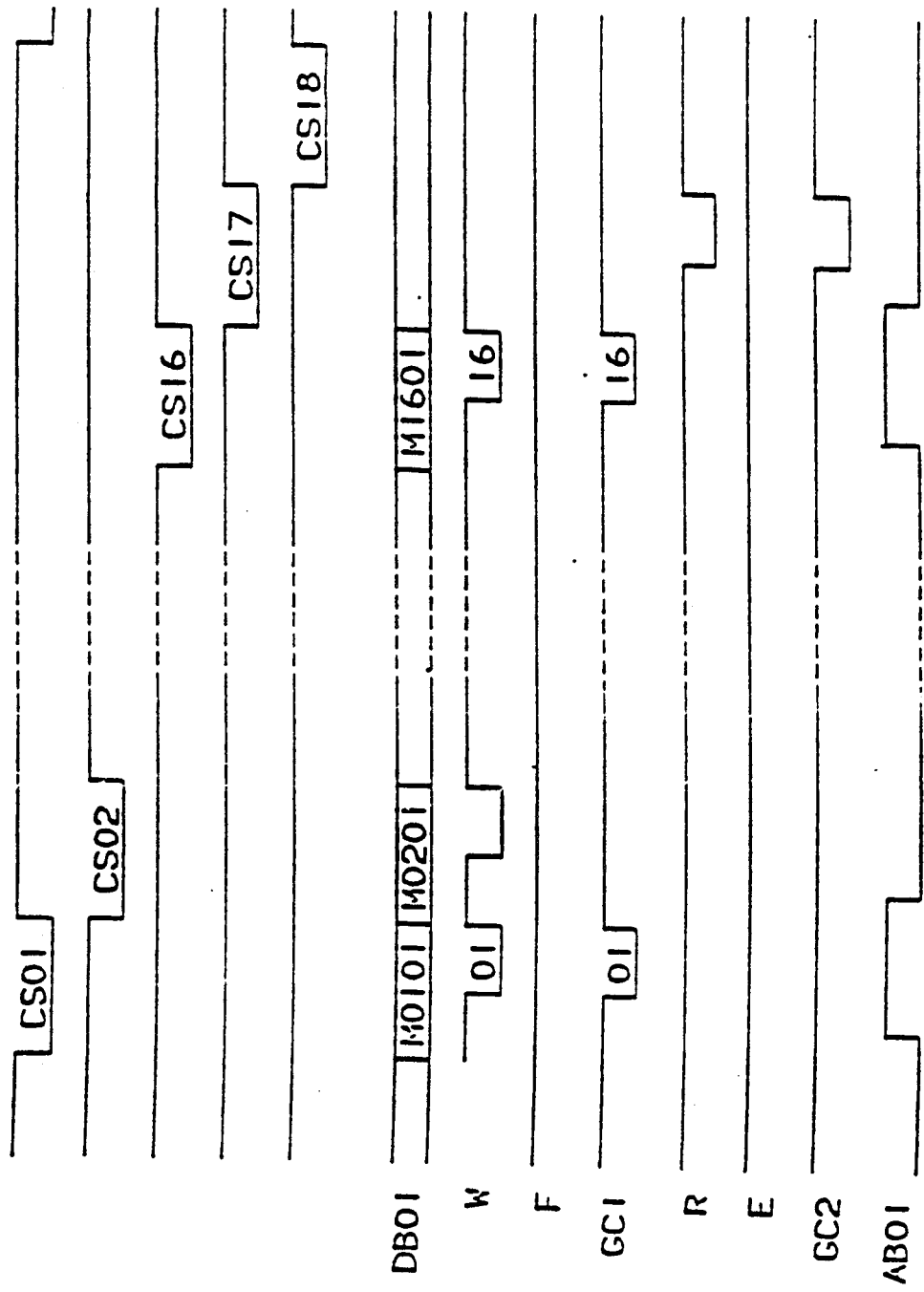
FIG. 7 represents pulse waveforms illustrating the operation of the memory RAM0101 of FIG. 1.

Finally, the clock circuit CLC in response to the clock signals CL1 and CL2 being applied to it provides the following output signals shown in FIGS. 3, 5 and 7:

a clock signal CL3 (FIGS. 3, 5) which has a frequency of 37.5 MHz, i.e. half the frequency of CL1, and a period T3;

staggered clock signals CS01 to CS18 (FIGS. 3, 5) which have each a period equal to 18 times that of CL3 and include each a negatively directed pulse also called CS01/18 having a duration equal to T3;

write and read signals W and R (FIG. 7). W comprises a plurality of negatively directed pulses occurring during CS01/16, whilst R comprise a negatively directed pulse occurring during CS17. The write and read signals W and R are applied to the like named inputs of the RAMs.

Because all the data buffers are identical only one of them, i.e., DB0101, is shown in detail in FIG. 2. This data buffer circuit DB0101 includes 4 D-flipflops DF1 to DF4, 38 latch circuits L01 to L38, and 36 tristate buffers TB37/38/04/ . . . /35/36. The data input D0101 of the buffer DB0101 is connected to the D-input of DF1 whose data output Q1 is connected to the D-input of DF2 and DF3 respectively. The data output Q2 of DF2 is connected to the D-input of DF4. The data outputs Q3 and Q4 of DF3 and DF4 are connected to the data inputs of the latch circuits L02/04/ . . . /36 and L01/03/ . . . /35 respectively and the data outputs of L01 and L02 are connected to the data inputs of L37 and L38 respectively. The data outputs L37, L38, L03, L04, . . . , L35, L36 of the latch circuits are connected to the inputs of the respective three-state buffers TB37; TB38; TB03; TB04; . . . ; TB35; TB36 whose outputs M37/38/03/ . . . /35/36 constitute the 36-wire output of the buffer DB0101. The clock inputs of DF1/2, DF3/4, L01/02, L037/38/03/04, . . . , L35/36 are controlled by the clock signals CL1, CL3, CS01, CS02, . . . , CS18 respectively, whilst all the tristate buffers are controlled by CS01.

It should be noted that the tristate buffers of the other data buffers DB0201 to DB1601 of the central memory circuit CMC01 are likewise controlled by the clock signals CS02 to CS16 respectively. In general, the buffers DB0101/0108 to DB1601/1608 are controlled by the clock signals CS01 to CS16 respectively.

Another embodiment of the data buffer DB0101 is represented in FIG. 3. It includes two D-flipflops DF1 and DF2 and 35 latch circuits L01 to L35. The data input D0101 of the buffer DB0101 is connected to the D-input of DF1 whose data output Q1 is connected to the data inputs of DF2 and L35. The data outputs Q3 and Q4 of DF2 and L35 are connected to the data inputs of the latch circuits L01/03/ . . . /33 and L02/04/ . . . /34 respectively. The data outputs L01, L02, . . . L33, L34, Q3, Q4 of these circuits L01/35 and DF2 are connected to the inputs of respective three-state buffers (not shown) in a similar way as in FIG. 2 and the outputs of these tristate buffers constitute the 36-wire output M0101 of the buffer DB0101. The clock input of DF1; DF2/L35; L01/02; ... and L33/34 are controlled by the clock signals CL1, CL3, CS01, ..., CS17 respectively.

Figure 6:
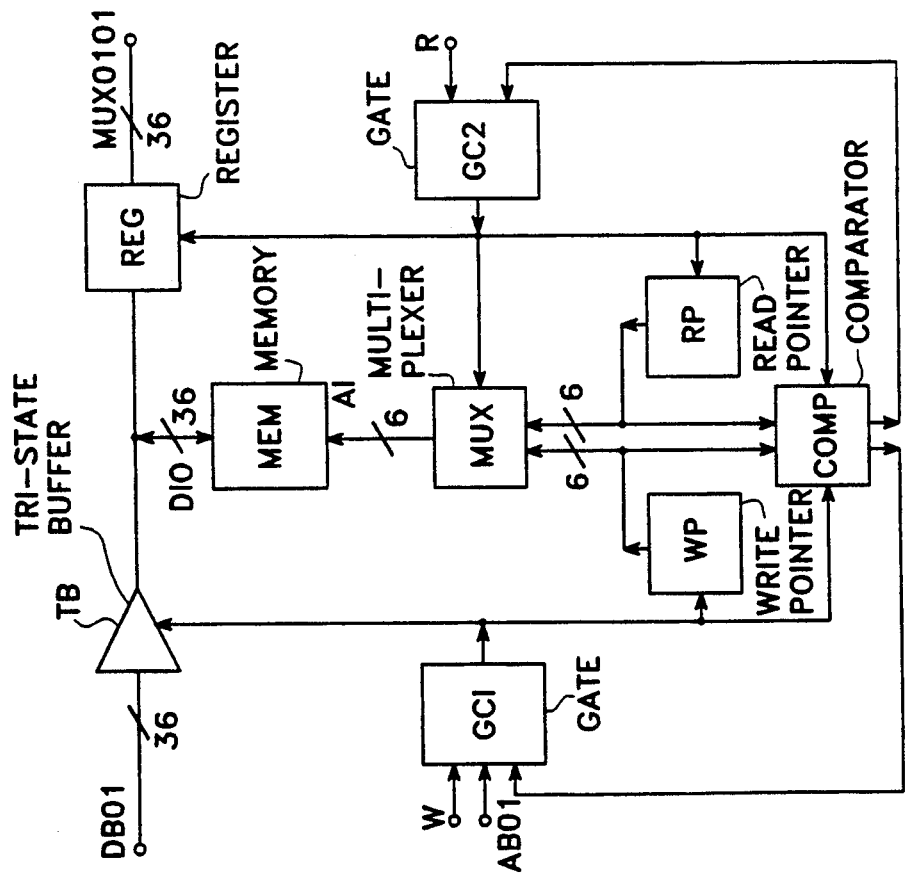
FIG. 6 shows the random access memory RAM0101 of FIG. 1 in more detail.

Because all the random access memories RAMs are alike only one of them, i.e. RAM0101, is shown in detail in FIG. 6. This single port RAM has an address input AB01, a write signal input W, a read signal input R and a data output MUX0101 and includes a memory MEM, a write pointer WP, a read pointer RP, a comparator COMP, a multiplexer MUX, a register REG, a tristate buffer TB and gating circuits GC1 and GC2. The 36-wire data input DB01 is connected to the 36-wire data input/output DIO of the memory MEM as well as to the 36-wire input of the register REG whose 36-wire output constitutes the output MUX0101 of the buffer. The write and read pointers WP and RP have 6-wire address outputs which are connected to corresponding inputs of the multiplexer MUX whose 6-wire output is connected to the address input AI of the memory MEM. The address outputs of WP and RP are also connected to the comparator COMP having "full" and "empty" outputs F and E which are activated when the memory is full and empty respectively and which control the gating circuits GC1 and GC2 respectively. Other inputs of GC1 are W and AB01 and the output of GC1 controls the tristate buffer TB as well as the write pointer WP and the comparator COMP. Another input of GC2 is R and the output of GC2 controls the register REG, the multiplexer MUX, the read pointer RP and the comparator COMP. The output signals GC1 and GC2 provided by these gating circuits may be represented by the Boolean functions (1) and (2) given at the end of the description and wherein AB'01 is the complement of AB01.

Figure 8:
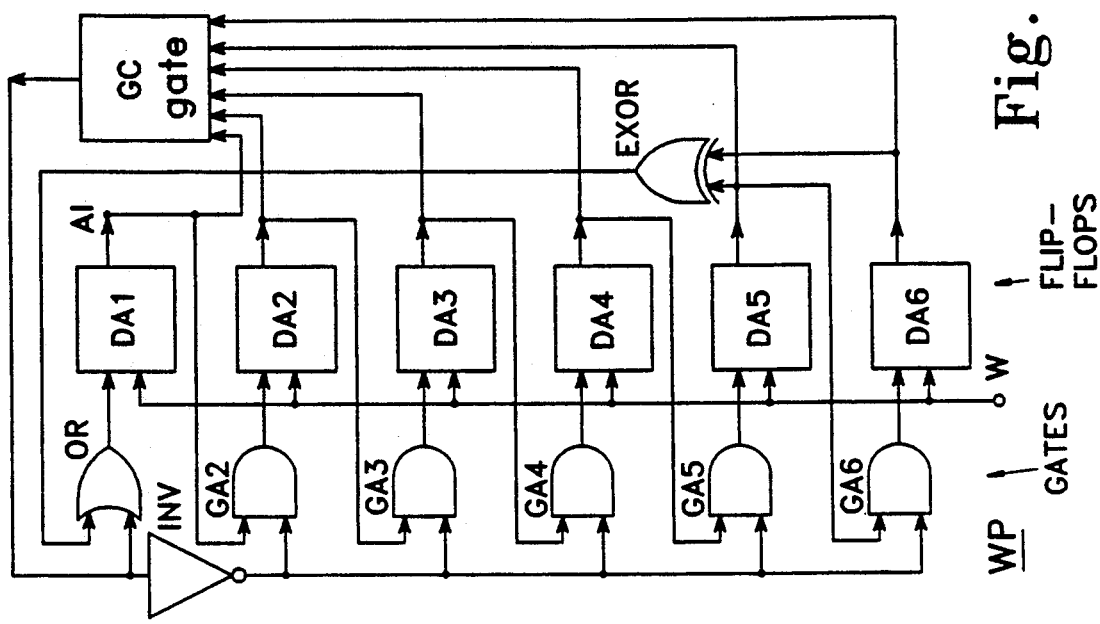
FIG. 8 shows the write pointer WP of FIG. 7 in more detail.

The write and read pointers of FIG. 6 are closed loop shift registers of the type shown in FIG. 8. The latter figure more particularly represents the write pointer WP in more detail. This write pointer comprises a closed loop shift register with 6 stages DA1 to DA6 each constituted by a D-flipflop. The data outputs A1/5 of these flipflops DA1/5 are connected to the data inputs of DA2/6 through first inputs of AND-gates GA2/6 and the outputs A1/6 are also connected to a gating circuit GC whose output is directly connected to a first input of an OR-gate OR and via an inverter INV to the second inputs of the AND-gates GA2/6. The data outputs A5 and A6 are connected to the second input of the OR-gate OR through an exclusive OR-gate. The gating circuit GC provides at its output a control signal GC which may be represented by the Boolean function (3) given at the end of the description and wherein A'1/6 are the complements of A1/6. The clock inputs of the stages DA1/6 are connected to a common write signal input W.

When the outputs of A1/6 are on 0 the output of the gating circuit GC is activated, as a consequence of which the stage DA1 is brought in the 1-condition through the OR-gate OR. Each time the write signal W is then activated the closed loop shift register is stepped through one of 52 successive positions. When reaching the last position wherein the signals A'1, A2, A'3, A4, A'5 and A6 are all activated the output of GC is also activated, as a consequence of which the register is brought back in its initial condition.

The above described switching element SE operates as follows, when it is for instance assumed that data cells of 288 bits or 36 bytes are supplied to the signal inputs R01/16 of the receiver circuits RC01/16 at a bit clock rate of 600 MHz. In these receiver circuits the processing of the cells is performed in a staggered way with a staggering delay equal to the period T3 of CL3.

In a way similar to that described in the above international patent application No. PCT/EP88/00273 (corresponding to commonly assigned U.S. application Ser. No. 07/585,167 in the name of B. J. G. Pauwels) successively provides on its 8-wire data output D01/16 the 36 bytes of an applied data cell at the byte clock frequency CL1=75 MHz. This means that the first, second, ..., eighth bits of the 36 data bytes of the cells applied to RC01/16 successively appear on the respective wires D0101, ..., D0108/D1601, ..., D16008 of the outputs D01/D16. And due to the staggered operation of the receiver circuits RC01/16 homologous bits of the cells applied to them are successively generated on homologous output wires with a staggering delay equal to T3. For instance, in the receiver circuit RC01 the group of first bits, called B01, B02, ..., B36 of the 36 bytes of each cell applied thereat are successively generated on the output wire D0101. And the group of first bits of the 36 bytes of each cell applied to RC16 are successively generated on the output wire D1601 a time interval equal to 15 staggering delays T3 after the generation of B01, B02, ..., B36 by RC01, as shown in FIG. 3.

The 17 address bits defining the one or more transmitter circuits TC01/17 to which a cell received in a receiver circuit RC01/16 has to be transmitted, successively appear on the single address output A01/16 of this receiver circuit RC01/16 at the clock frequency CL3 i.e. with a period T3. This is slightly different from what is described in the last mentioned PCT patent application where the address bits are provided in parallel. Again due to the staggered operation of the receiver circuits, homologous address bits are successively generated on the outputs A01/16 with a staggering delay equal to a period T3.

In the same way as described in the above mentioned international patent application no. PCT/EP88/00212 (P. Debuysscher 5) the bytes of each cell processed by RC01/16 are split up in 8 bits and these are applied to respective ones of the 8 control or central memory circuits.

When only considering the central memory circuit CMC01 it follows from the above and from FIG. 1 that the group of first data bits of the 36 bytes of the cells supplied to RC01/16 are successively applied to the data buffer circuits DB0101/1601 at the byte clock rate CL1=75 MHz and in a staggered fashion, with a staggering delay equal to a period T3. In a similar way the groups of address bits generated by RC01/16 are successively applied to the address buffer circuits AB0101/1601 at the rate of the clock CL3=37.5 MHz and also in a staggered way. Thus each data bit stream supplied to a memory circuit is accompanied by a corresponding address bit stream. For instance, the data bit stream applied to DB0101 is accompanied by the address bit stream supplied to AB0101 and the same is true for DB1601 and AB1601.

The staggered data bit streams applied to DB0101/1601 and the staggered address bit streams applied to AB0101/1601 are entered therein and then applied in a staggered fashion to the data bus DB01 and to the address bus AB01 respectively. This is described hereinafter for the address buffer AB0101 and for the data buffer DB0101 of FIG. 2.

In the address buffer AB0101 a series to parallel conversion is performed so that the group of 17 address bits associated to the data bits of a cell appear at the 17-wire output of this buffer and therefore also on the address bus AB01. As a consequence one or more of the address wires connecting the bus AB01 to the RAMs RAM0101/1701 are activated.

In the data buffer DB0101 of FIG. 2 the data bitstream D0101 comprising the data bits B01 to B36 of each cell supplied to the buffer is processed in the way shown in FIGS. 2 and 3 to which reference is made.

Under the control of the byte clock CL1 this data bit stream is entered in the flipflops DF1 and DF2 and appears at the outputs Q1 and Q2 thereof with a delay equal to T1 and T3 respectively, T1 being the period of CL1. These two mutually delayed data bitstreams are then sampled into the flipflops DF3 and DF5, which constitute sampling means, under the control of the slower clock CL3 so that two sampled data bitstreams comprising the data bits B02, B04, . . . , and B01, B03, . . . each having a duration T3 appear on the outputs Q3 and Q4 of DF3 and DF4 respectively. Finally, under the control of clock pulses CS01 to CS18 the pairs of bits B01, B02; . . . ; B35, B36 are successively latched in the pairs of latch circuits L01, L02; . . . ; L35, L36 respectively, and under the control of CS02 the bits B01 and B02 are latched in the latch circuits L37 and L38. In other words the 36 sampled bits B01/02/03/04; B05/B06; . . . ; B35/36 are latched in the respective latch registers L37/38/03/04; L05/06; . . . ; L35/L36 by the clock signals CS02; CS03; . . . ; CS18 respectively. This means that all these 36 bits are available on the latch outputs during the clock signal CS01 following CS18. This is the reason why these outputs are connected to the outputs M37/38/03/04/ . . . /35/36 of the buffer DB0101 through tristate buffers TB37/38/03/04/ . . . /35/36 controlled by CS01. Indeed, in this way the output data, called M0101, available in DB0101 is put on the bus DB01 during CS01.

The necessity to provide the use of the additional latch circuits L37 and L38 appears from FIG. 3 where the portions marked NS represent time intervals during which the information is not very stable. Without L37 and L38 the information would never be fully stable during CS01 to CS18, but by providing L37 and L38 the data called M0101 available during CS01 becomes stable and may therefore be outputted on the data bus DB01 by CS01.

Likewise the data called M0201 (FIG. 7) to M1601 (not shown) available in the data buffers DB0201 to DB1601 of the central memory circuit CMC01 is put on the data bus DB01 by the clock signals CS02 to CS16 (not shown) respectively.

In general, the data available in the data buffers DB0101/1601 to DB0108/1608 is put on the respective data busses DB01 to DB08 by the clock signals CS01 to CS16 respectively.

In connection with FIG. 2 it should be noted that the buffer shown therein has a relatively low power consumption when compared with a solution similar to the one shown in the above mentioned international patent application No PCT/EP88/00212 (P. Debuysscher 5) and which would comprise a 36-bit shift register clocked by CL1 and connected to a parallel 36-bit latch register. Indeed, instead of operating at this frequency CL1, in the circuit FIG. 2 only DF1/2 operate at this frequency, whilst DF3/4 operate at the lower frequency CL3 and the latch circuits are controlled by the lower frequency pulses CS01/18. Moreover, the same control pulses CL1, CL3 and CS01/18 are used to control all the buffer circuits.

The operation of the data buffer DB0101 shown in FIG. 4 is slightly different but very similar to that just described for DB0101 of FIG. 2. Indeed, as follows from FIG. 5 the input data bit stream D0101 is entered in the flipflop DF1 under the control of the byte clock CL1 and the bitstream thus generated at the output Q1 of this flipflop is sampled in DF2 and L35 under the control of the clock CL3. Thus two sampled data bit streams Q3 and Q4 comprising the data bits B01/03/05, . . . and B02/04/06 each having a duration T3 appear on the like named outputs Q3 and Q4 of DF2 and L35 respectively. Finally, under the control of the clock pulses CS01 to CS17 the pairs of bits B01, B02; . . . , B35, B36 are successively latched in the pairs of latch circuits L01, L02; . . . ; L33, L34 respectively. Because DF2 and L35 respectively store the bits B35 and B36 after CS17 has elapsed their outputs Q3 and Q4 are connected together with the outputs of L01/ . . . /L34 to the above mentioned tristate buffer circuits.

The data put on the last mentioned data bus DB01 in the way described above may be written in one or more of the associated RAMs depending on the condition of the output GC1 of the gating circuit GC1, i.e. of the write input W, the address input AB01 and the "full" output F of the comparator COMP. Conversely data stored in maximum 16 data buffers may be successively written in each RAM, also depending on the condition of the output of GC1.

For instance, when W, AB01 and F are as shown in FIG. 7 then the output signal GC1 has two negatively directed write pulses 01 and 16. By each of these pulses the data M0101 and M1601 then present on the data input DB01 are applied to the data input/output DIO of the memory MEM via TB and are written therein at the address then applied to the address input AI of this memory via the multiplexer MUX. The address provided by WP and not that provided by RP is applied to AI because the output of the gating circuit GC2 is then activated. By the trailing edges of each of the pulses 01 and 16 the write pointer WP is stepped and the comparator COMP is informed of the fact that a writing operation has taken place. This information is necessary when the comparator COMP detects that WP and RP are in the same position and has to decide whether this corresponds to a full or empty memory. Indeed, when in this case the last operation was a write operation the memory MEM is full, whereas the contrary is true if the last operation was a read operation.

From the above description of FIG. 2 it follows that in each data buffer data are stored under the control of 18 clock signals CS01 to CS18, and data stored in the 16 buffers associated to a same data bus are successively put on this data bus under the control of 16 clock signals CS01 to CS16 and may then be successively written in one or more RAMs. This means that a third time interval equal to 2T3 and corresponding to the clock signals CS17 and CS18 remains available to read data from a RAM by means of a read signal R.

More particularly the data stored in the memory MEM of the RAM, shown in FIG. 6, at the address provided by the read pointer RP may be read depending on the condition of the output GC2 of the gating circuit GC2, i.e. of the read input R and of the "empty" input E of the comparator COMP. For instance, when R and E are shown in FIG. 7 then the output signal GC2 has a negatively directed read pulse during CS17. By this pulse the data present in the memory MEM at the address then applied by the read pointer RP to the address input AI of this memory MEM via the multiplexer MUX are provided at the data input/output DIO of MEM and applied to the register REG. By the trailing edge of this pulse the data read is then entered in the register REG. From this register and via the output MUX0101 these data are applied to the associated multiplexer MUX0101 which performs a parallel-to-series conversion of these data under the control of a 6-bit selection signal (not shown). The resultant series bitstream is applied to the associated transmitter circuit TC01 and is combined therein with the 7 other bitstreams applied thereat from MUX0102 to MUX0108 and then generated at the output T01.

It should be noted that when data are transmitted to the transmitter circuit TC17, they are processed in the control circuit SEC and applied to the selection bus SB to one of the receiver circuits RC01/IC in the way described in the above mentioned international patent application PCT/EP88/00482 (corresponding to commonly assigned U.S. application Ser. No. 07/613,511 in the name of P. I. A. Barri).

Due to the fact that in each RAM the writing and reading operations are performed in sequence this RAM may be of the single port type instead of being of the dual port type. The latter allows simultaneous reading and writing but on a chip it occupies a surface of about 1.6 times that occupied by a single port RAM and is therefore more expensive.

Because the same write signals W as well as the same read signals R are used by all the RAMs of the switching element SE the write and read control of these RAMs is simple. Moreover, because the read data are the simultaneously available on the outputs of these RAMs all the demultiplexers connected to these outputs may be controlled by the same selection signals.

In connection with the above described switching element SE, it may finally be noted that any loss of synchronisation of the operation of the RAMs, and more particularly of those processing the bits of a same cell, e.g. due to a non-permanent failure of the pointers, will automatically be restored. Indeed, as the outgoing links connected to the outputs T01/16 of the switching element SE are for instance only occupied during 80% of the time, the 20% remaining time will generally be sufficient to bring the non-synchronized write and read pointers of the above RAMs in a position indicating that these RAMs are empty. From that moment onwards the RAMs have a synchronized operation.

$$GC1 = W + F + AB'01 \quad (1)$$

$$GC2 = R + E \quad (2)$$

$$GC = A'1.A2.A'3.A4.A'5.A6 + A'1.A'2.A'3.A'4.A'5.A'6 \quad (3).$$

While the principles of the invention have been described above in connection with specific apparatus, it is to be clearly understood that this description is made only by way of example and not as a limitation on the scope of the invention.

We claim:

1. Communication switching element comprising:
   a plurality of input circuits, each said input circuit having one or more respective first data output terminals,
   a plurality of output circuits, each said output circuit having one or more respective first data input terminals, and
   one or more central memory circuits each for selectively transferring data from a different respective said first data output terminal of said input circuits to a corresponding different respective said first data input terminal of said output circuits, each of said central memory circuits further comprising
   a respective common data write bus to which the respective said first data output terminals of each of said input circuits are coupled, and
   a respective plurality of individual memory circuits, each associated with a respective different said output circuit and having a respective second data input terminal coupled to said respective common data write bus and a respective second data output terminal individually coupled to the respective said first input terminal of the associated output circuit, all said individual memory circuits associated with a single one of said one or more central memory circuits having a common write signal input terminal as well as a common read signal input terminal.

2. Communication switching element according to claim 1, wherein said individual memory circuits are random access memories of the single port type.

3. Communication switching element according to claim 2, wherein said single port random access memory has a data input, a data output, an address input, a write signal input and a read signal input, and further comprises
   a memory with a single data input/output to which said data input is coupled via a switch and which is coupled to said data output through a register,
   a first gating circuit controlled at least by said write signal and address inputs and controlling said switch, and
   a second gating circuit controlled at least by said read signal input and controlling said register.

4. Communication switching element according to claim 3, wherein said random access memory further comprises a write pointer and a read pointer which are both coupled to an address input of said random access memory as well as to a comparator which provides a first output signal when said random access memory is full and a second output signal when said random access memory is empty, said first and second output signals controlling said first and second gating circuits respectively.

5. Communication switching element according to claim 1, wherein each said one or more first data output terminals comprises a plurality of wires in parallel, the constituent wires of which are connected to respective ones of a plurality of said one or more central memory circuits.

6. Communication switching element according to claim 1, wherein said one or more central memory circuits is a plurality of said central memory circuits, with all said memory circuits associated with all said central memory circuits having a common write signal input as well as a common read signal input.

7. Communication switching element according to claim 1, further comprising
- data buffer means for coupling said input circuits to said data write bus and for storing groups of data in a staggered fashion, each group being stored during a respective first time interval, said data buffer means being able to put their respective groups of data successively on said data write bus during a respective second time interval which has a duration less than that of the first time interval by an amount equal to the duration of a third time interval and
- a clock circuit providing write and read signals making said write and read signal inputs of said individual memory circuits operative during said second and third time intervals respectively.

8. Communication switching element according to claim 7, wherein each of said input circuits also has a respective first address output terminal coupled to an address bus in said central memory circuit through a respective address buffer means enabling memory circuit addresses provided by said input circuits to be successively put on said address bus in time coincidence with the corresponding groups of data being output on said data write bus.

9. Communication switching element according to claim 8, wherein
- the constituent wires of said address bus are each connected to an address input of a respective one of said individual memory circuits and
- said address buffer means are each able to simultaneously activate one or more of the address inputs of said individual memory circuits under the control of the address then put on said address bus.

10. Communication switching element according to claim 7, wherein each of said data buffer means further comprises
- delay means subjecting an incoming data bitstream generated by an input circuit at a first frequency to a plurality of delays so as to provide mutually delayed data bitstreams,
- sampling means for sampling each of said delayed data bitstreams with a second frequency equal to 1/m of said first frequency so as to provide m sampled bitstreams containing different bits of said incoming data bitstream,
- latching means for latching the bits of said m sampled bitstreams in respective ones of m latch registers operating at said sampling frequency, and
- output means to put the contents of said latch registers simultaneously on said data write bus.

11. Communication switching element according to claim 10, wherein said delay means further comprises first and second D-flipflops both controlled at said first frequency, an output of said first flipflop being connected to a data input of said second flipflop, the outputs of said first and second flipflops constituting the outputs of the delay means.

12. Communication switching element according to claim 11, wherein said sampling means further comprises third and fourth D-flipflops both controlled at said second frequency and having data inputs to which the data outputs of said first and second flipflops are connected respectively, as well as data outputs coupled to said latching means.

13. Communication switching element according to claim 7, wherein each of said data buffer means includes sampling means for sampling an incoming data bitstream having a first frequency at a second frequency equal to 1/m of said first frequency so as to provide a plurality of bitstreams containing different bits of said incoming data bitstream, latching means for latching the bits of said bitstreams in respective ones of a plurality of latch registers operating at said second frequency, and output means to put the contents of said latch registers simultaneously on said data write bus.

14. Communication switching element according to claim 13, wherein said sampling means further comprises a first D-flipflop and a latch circuit having a common data input to which said incoming data bitstream is applied as well as data outputs coupled to said latching means, the outputs of said latching means and of said first flipflop and said latch circuit being coupled to the output of the buffer means.

15. Communication switching element according to claim 1, wherein each of said individual memory circuits has a respective individual write and read control circuit.

16. Communication switching element according to claim 15, wherein each said individual write and read control circuit includes a respective write pointer and a respective read pointer for its respective individual memory, at least one of said pointers comprising a closed loop shift register having a plurality of stages.

17. Communication switching element according to claim 16, wherein in said closed loop shift register the outputs of said stages are coupled to a gating circuit to detect at least one first predetermined position of said closed loop shift register and to then bring said shift register into a second predetermined position.

* * * * *